United States Patent [19]

Iwata et al.

[11] Patent Number: 4,819,112
[45] Date of Patent: Apr. 4, 1989

[54] THIN FILM MAGNETIC HEAD

[75] Inventors: Tetsuya Iwata; Tatsuya Saito, both of Nagaoka, Japan

[73] Assignee: Alps Electric Co., Ltd., Japan

[21] Appl. No.: 111,552

[22] Filed: Oct. 20, 1987

[30] Foreign Application Priority Data

Jan. 6, 1987 [JP] Japan .................................... 62-476

[51] Int. Cl.$^4$ ............................................. G11B 5/147
[52] U.S. Cl. ................................................... 360/126
[58] Field of Search ........................... 360/126; 29/603

[56] References Cited

U.S. PATENT DOCUMENTS 4,550,353 10/1985 Hirai ............................... 360/126 X Primary Examiner—A. Heinz
Attorney, Agent, or Firm—Guy W. Shoup; Paul J. Winters

[57] ABSTRACT

A thin film magnetic head fabricated in accordance with a thin film manufacturing method comprising a front end of an upper core layer formed on a magnetic gap layer, and a rear end of the upper core layer formed on an interlayer insulating layer for insulating a conductor coil layer to be coupled with the front end of the upper core layer, and a method for manufacturing a thin film magnetic head fabricated by a thin film manufacturing method comprising the steps of forming a lower core layer on a substrate made of a nonmagnetic material, forming a magnetic gap layer on the lower core layer, forming a front end of an upper core layer on the magnetic gap layer, forming an interlayer insulating layer and a conductor coil layer on the magnetic gap layer, and forming a rear end of the upper core layer coupled with the front end of the upper core layer and the lower core layer on the interlayer insulating layer for insulating the conductor coil layer. Thus, this thin film magnetic head does not cause a magnetic gap layer from being deteriorated in its characteristics by separating an upper core layer into front and rear ends and forming the front end of the upper core layer subsequently to the forming of the magnetic gap layer.

3 Claims, 3 Drawing Sheets 4,819,112

THIN FILM MAGNETIC HEAD

BACKGROUND OF THE INVENTION

1. Field of the Invention

This invention relates to a thin film magnetic head and a method for manufacturing the same and, more particularly, to a thin film magnetic head and a method for manufacturing the same used for a stationary disk unit or a magnetic tape transport as an external memory for a computer.

2. Description of the Prior Art

A conventional method for manufacturing a thin film magnetic head of this type heretofore has the steps of preparing a substrate 21 made of a nonmagnetic material as shown in FIG. 3(a) and forming to reduce the thickness of the front end 22a of a lower core layer 22 made of a magnetic material much thinner than the rear end on the substrate 21 as shown in FIG. 3(b). The method further has the steps of forming a magnetic gap layer 23 made of a nonmagnetic material on the lower core layer 22 and perforating a through hole 23a for connecting the lower core layer 22 to an upper core layer 31 to be described later as shown in FIG. 3(c). The method subsequently has the steps of sequentially forming an interlayer insulating layer 26, a first layer first conductor coil layer 27, an interlayer insulating layer 28, a second layer second conductor coil layer 29 and an interlayer insulating layer 30 as shown in FIG. 3(d). The method further has the steps of forming the upper core layer 31 made of a magnetic material as shown in FIG. 3(e), and forming the upper core layer 31 in a predetermined shape as shown in FIG. 3(f). The method thereafter has the steps of coating it with a protecting layer (not shown), and polishing it to complete a conventional thin film magnetic head.

Since the magnetic gap layer 23 of the most important portion for the thin film magnetic head is effected by various actions in the steps of forming the interlayer insulating layers 26, 28 and 30 and the conductor coil layers 27 and 29 after forming the layer 23 in the conventional method for manufacturing the thin film magnetic head described above, there arise drawbacks that the magnetic gap layer 23 is damaged by a number of the steps to cause the characteristics to be deteriorated and the flatness and the dimensions to be aggravated.

Inasmuch as the end of the interlayer insulating layer 26 of the portion for restricting a gap depth is effected by various actions in the following steps in the same manner as the case of the magnetic gap layer 23 in the conventional method for manufacturing the thin film magnetic head, there also arise drawbacks that the dimensional accuracy is deteriorated to cause the gap depth to be difficult to be precisely formed.

Since the the position of a connecting point of the lower core layer 22 to the upper core layer 31 is low and the hole for connecting the upper core layer 31 to the lower core layer 22 becomes deep in the conventional method for manufacturing the thin film magnetic head, there also arise drawbacks that a crystal growth of the magnetic material for forming the upper core layer 31 is disordered on the oblique surface of the hole.

SUMMARY OF THE INVENTION

Accordingly, an object of this invention is to provide a thin film magnetic head which can eliminate the above-mentioned drawbacks and which does not cause a magnetic gap layer from being deteriorated in its characteristics by separating an upper core layer into front and rear ends and forming the front end of the upper core layer subsequently to the forming of the magnetic gap layer.

Another object of this invention is to provide a thin film magnetic head which does not cause a magnetic gap layer from being deteriorated in its characteristics and which can accurately form a gap depth by separating an upper core layer into front and rear ends and forming the front end of the upper core layer subsequently to the forming of a gap depth restricting portion formed on the magnetic gap layer.

Yet another object of this invention is to provide a thin film magnetic head which can prevent a crystal growth of an upper core layer from being disordered on the oblique surface of a hole for connecting the upper core layer to a lower core layer by separating the lower core layer into two layers and highly forming a connecting point of the lower core layer to the upper core layer.

A further object of this invention is to provide a method for manufacturing a thin film magnetic head which does not cause a magnetic gap layer from being deteriorated in its characteristics by separating an upper core layer into front and rear ends and forming the front end of the upper core layer subsequently to the forming of the magnetic gap layer.

Still another object of this invention is to provide a method for manufacturing a thin film magnetic head which does not cause a magnetic gap layer from being deteriorated in its characteristics and which can accurately form a gap depth by separating an upper core layer into front and rear ends and forming the front end of the upper core layer subsequently to the forming of a gap depth restricting portion formed on the magnetic gap layer.

Still another object of the invention is to provide a method for manufacturing a thin film magnetic head which can prevent a crystal growth of an upper core layer from being disordered on the oblique surface of a hole for connecting the upper core layer to a lower core layer by separating the lower core layer into two layers and highly forming a connecting point of the lower core layer to the upper core layer.

According to features of this invention, there is provided a thin film magnetic head fabricated in accordance with a thin film manufacturing method comprising a front end of an upper core layer formed on a magnetic gap layer, and a rear end of the upper core layer formed on an interlayer insulating layer for insulating a conductor coil layer to be coupled with the front end of the upper core layer.

According to another features of this invention, there is provided a thin film magnetic head fabricated in accordance with a thin film manufacturing method comprising a gap depth restricting portion formed on a magnetic gap layer, a front end of an upper core layer formed on the magnetic gap layer and the gap depth restricting portion, and a rear end of the upper core layer formed on an interlayer insulating layer for insulating a conductor coil layer to be coupled with the front end of the upper core layer.

According to yet another features of this invention, there is provided a thin film magnetic head fabricated in accordance with a thin film manufacturing method comprising a first lower core layer formed on a substrate made of a nonmagnetic material, a magnetic gap layer formed on the first lower core layer, a gap depth restricting portion and a connecting point lifting portion formed on the magnetic gap layer, a front end of an upper core layer and a second lower core layer formed on the magnetic gap layer, the gap depth restricting portion and the connecting point lifting portion, and a rear end of the upper core layer formed on an interlayer insulating layer for insulating a conductor coil layer to be coupled with the front end of the upper core layer and the second lower layer.

According to further features of this invention, there is provided a method for manufacturing a thin film magnetic head fabricated by a thin film manufacturing method comprising the steps of forming a lower core layer on a substrate made of a nonmagnetic material, forming a magnetic gap layer on the lower core layer, forming a front end of an upper core layer on the magnetic gap layer, forming an interlayer insulating layer and a conductor coil layer on the magnetic gap layer, and forming a rear end of the upper core layer coupled with the front end of the upper core layer and the lower core layer on the interlayer insulating layer for insulating the conductor coil layer.

According to still another features of this invention, there is provided a method for manufacturing a thin film magnetic head fabricated by a thin film manufacturing method comprising the steps of forming a lower core layer on a substrate made of a nonmagnetic material, forming a magnetic gap layer on the lower core layer, forming a gap depth restricting portion on the magnetic gap layer, forming a front end of an upper core layer on the magnetic gap layer and the gap depth restricting portion, forming an interlayer insulating layer and a conductor coil layer on the magnetic gap layer, and forming a rear end of the upper core layer coupled with the front end of the upper core layer and the lower core layer on the interlayer insulating layer for insulating the conductor coil layer.

According to still another features of this invention, there is provided a method for manufacturing a thin film magnetic head fabricated by a thin film manufacturing method comprising the steps of forming a first lower core layer on a substrate made of a nonmagnetic material, forming a magnetic gap layer on the first lower core layer, forming a gap depth restricting portion and a connecting point lifting portion on the magnetic gap layer, forming a front end of an upper core layer and a second lower core layer on the magnetic gap layer, the gap depth restricting portion and the connecting point lifting portion, forming an interlayer insulating layer and a conductor coil layer on the second lower core layer, and forming a rear end of the upper core layer coupled with the front end of the upper core layer and the second lower core layer on the interlayer insulating layer for insulating the conductor coil layer.

In the thin film magnetic head of this invention, the front end of the upper core layer formed on the magnetic gap layer and the rear end of the upper core layer formed on the interlayer insulating layer for insulating the conductor coil layer are coupled to form the upper core layer.

In the thin film magnetic head of this invention, the gap depth restricting portion formed on the magnetic gap layer restricts the gap depth of the front end of an upper core layer formed on the magnetic gap layer, thereby forming the gap depth in high dimensional accuracy.

In the thin film magnetic head of this invention, the connecting point lifting portion formed on the magnetic gap layer highly forms the connecting position to the rear end of the upper core layer of the second lower core layer so that the hole for connecting becomes shallow, thereby reducing the disorder of the crystal growth of the rear end of the upper core layer on the oblique portion of the hole.

In the method for manufacturing the thin film magnetic head of this invention, the lower core layer is formed on the substrate made of the nonmagnetic material, the magnetic gap layer is formed on the lower core layer, the front end of an upper core layer is formed on the magnetic gap layer, the interlayer insulating layer and the conductor coil layer are formed on the magnetic gap layer, and the rear end of the upper core layer coupled with the front end of the upper core layer and the lower core layer is formed on the interlayer insulating layer for insulating the conductor coil layer.

In the method for manufacturing the thin film magnetic head of this invention, the lower core layer is formed on the substrate made of a nonmagnetic material, the magnetic gap layer is formed on the lower core layer, the gap depth restricting portion is formed on the magnetic gap layer, the front end of the upper core layer is formed on the magnetic gap layer and the gap depth restricting portion, the interlayer insulating layer and the conductor coil layer are formed on the magnetic gap layer, and the rear end of the upper core layer coupled with the front end of the upper core layer and the lower core layer is formed on the interlayer insulating layer for insulating the conductor coil layer.

In the method for manufacturing the thin film magnetic head of this invention, the first lower core layer is formed on the substrate made of a nonmagnetic material, the magnetic gap layer is formed on the first lower core layer, the gap depth restricting portion and the connecting point lifting portion are formed on the magnetic gap layer, the front end of the upper core layer and the second lower core layer are formed on the magnetic gap layer, the gap depth restricting portion and the connecting point lifting portion, the interlayer insulating layer and the conductor coil layer are formed on the second lower core layer, and the rear end of the upper core layer coupled with the front end of the upper core layer and the second lower core layer is formed on the interlayer insulating layer for insulating the conductor coil layer.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

The present invention will be described in detail with reference to the accompanying drawings.

Figure 1:
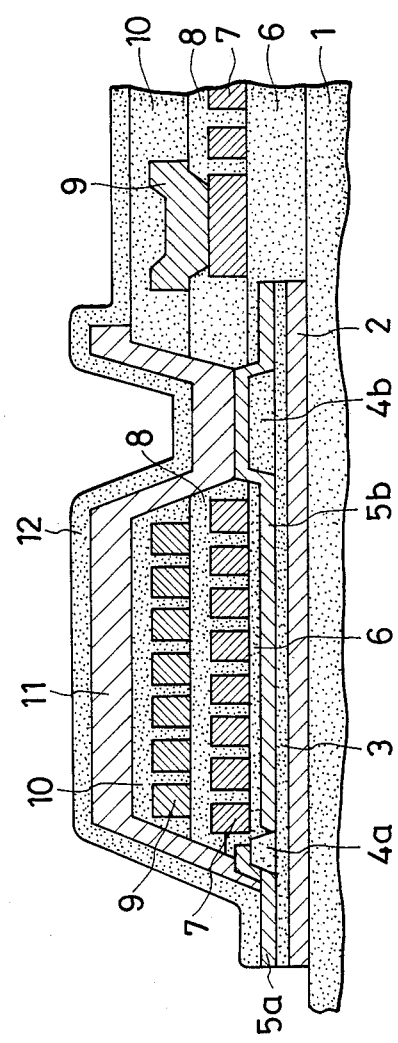
FIG. 1 is a sectional view showing an embodiment of a thin film magnetic head according to the present invention.

FIG. 1 is a sectional view showing an embodiment of a thin film magnetic head according to the present invention. The thin film magnetic head of this embodiment comprises a substrate 1 made of a nonmagnetic material, a first layer first lower core layer 2 formed of a magnetic material on the substrate 1, a magnetic gap layer 3 formed of a nonmagnetic material on the first lower core layer 2, a gap depth restricting portion 4a and a connecting point lifting portion 4b formed of a nonmagnetic material on the magnetic gap layer 3, the magnetic gap layer 3, a front end 5a of an upper core layer 5 and a second layer second lower core layer 5b formed of a magnetic material on the gap depth restricting portion 4a and the connecting point lifting portion 4b, an interlayer insulating layer 6 formed of an insulator for insulating and flattening on the second lower core layer 5b, a first layer first conductor coil layer 7 formed planely spirally of a conductor on the interlayer insulating layer 6, an interlayer insulating layer 8 formed of an insulator for insulating and flattening on the first conductor coil layer 7, a second layer second conductor coil layer 9 formed planely spirally of a conductive material on the interlayer insulating layer 8, an interlayer insulating layer formed of an insulator for insulating and flattening on the second conductor coil layer 9, a rear end 11 of an upper core layer coupled with the upper core front end 5a and the second lower core layer 5b on the interlayer insulating layer 10, and a protecting layer 13 formed of a protecting material on the rear end 11 of the upper core layer in the essential portion.

In the thin film magnetic head of this embodiment, the first lower core layer 2 and the second lower core layer 5b are not directly connected, but since the magnetic gap layer 3 interposed between both is extremely thin such as several microns, a magnetic flux flows through the magnetic gap layer 3 to eliminate a defect in the function as the lower core layer.

Then, the method for manufacturing the thin film magnetic head of the embodiment constructed as described above will be described with reference to FIGS. 2(a) to 2(f).

Figure 2A:
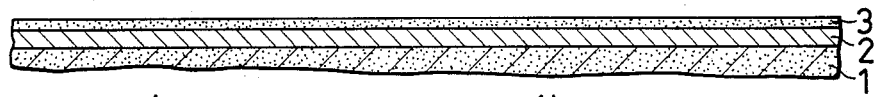
FIGS. 2(a) to 2(f) are sectional views sequentially showing the steps of a method for manufacturing the thin film magnetic head shown in FIG. 1.

As shown in FIG. 2(a), a substrate made of a nonmagnetic material such as alutec, nonmagnetic ferrite is coated with a material which can readily produce flatness such as alumina by sputtering and accurately polished to be used as the substrate 1, the first layer first lower core layer 2 is formed by sputtering or plating a magnetic material such as ferrite on the substrate 1, and the magnetic gap layer 3 is formed by sputtering a nonmagnetic material such as alumina.

Figure 2B:
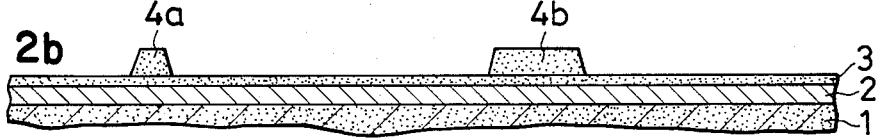

Then, as shown in FIG. 2(b), a nonmagnetic material of an organic material such as polyimide or an inorganic material such as silica or alumina is laminated and processed to form the gap depth restricting portion 4a for producing the gap depth of the front end of the upper core layer and a connecting point lifting portion 4b for connecting the second lower core layer 5b to the rear end 11 of the upper core layer at the high position.

Figure 2C:
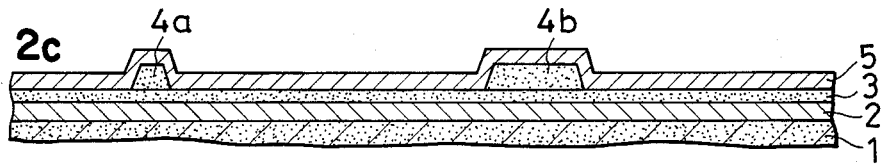

Subsequently, as shown in FIG. 2(c), a magnetic material such as ferrite, sendust or amorphous metal is sputtered to form the magnetic material layer 5.

Figure 2D:
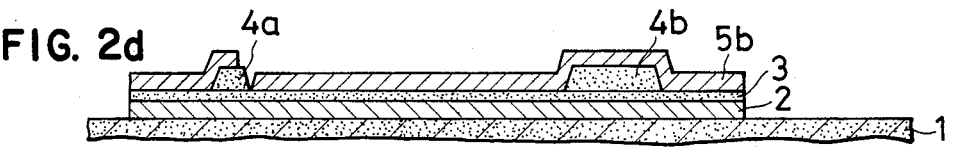

Then, as shown in FIG. 2(d), the magnetic material layer 5 is processed by etching means such as milling to separate the front end 5a of the upper core layer and the second layer second lower core layer 5b. At this time, the gap depth of the front end 5a of the upper core layer is accurately produced by the gap depth restricting portion 4a, and the connecting point of the second lower core layer 4b to the rear end 11 of the upper core layer is formed by the connecting point lifting portion 4b at a high position.

Figure 2E:
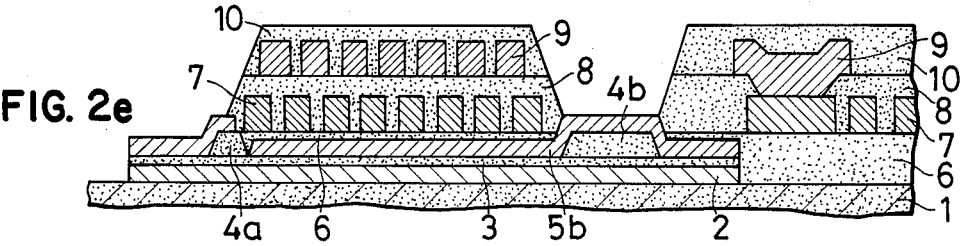

Successively, as shown in FIG. 2(e), an insulating material such as, for example, an organic material such as polyimide or an inorganic material such as silica or alumina is laminated on the second lower core layer 5b for insulating and flattening to form the interlayer insulating layer 6, the first conductor coil layer 7 is formed planely spirally by sputtering of a conductive material such as copper or aluminum on the interlayer insulating lawyer 6, an insulating material such as an organic material such as polyimide or an inorganic material such as silica or alumina is laminated on the first conductor coil layer 7 to form the interlayer insulating layer 8, the second conductor coil layer 9 is planely spirally formed by sputtering a conductive material such as copper or aluminum on the interlayer insulating layer 8, and an insulating material such as an organic material such as polyimide or an inorganic material such as silica or alumina is laminated for insulating and flattening on the second conductor coil layer 9 to form the interlayer insulating layer 10.

Figure 2F:
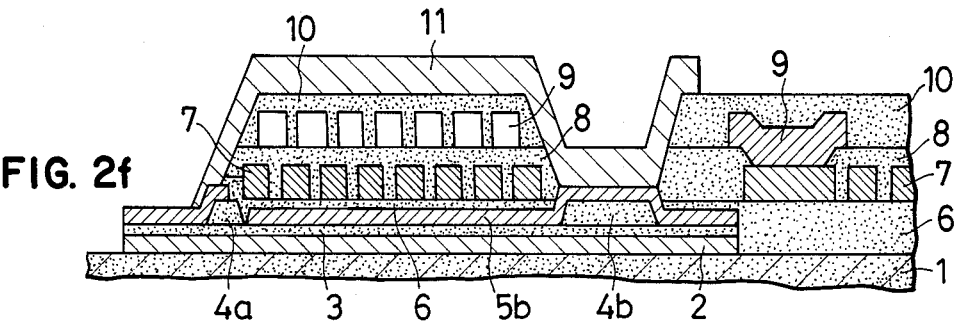
Figure 3A:
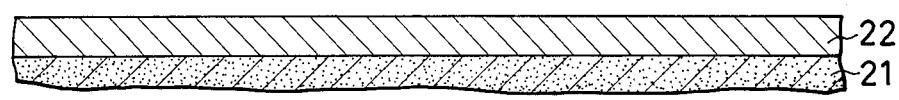
FIGS. 3(a) to 3(f) are sectional views sequentially showing the steps of an example of a conventional method for manufacturing a thin film magnetic head.
Figure 3B:
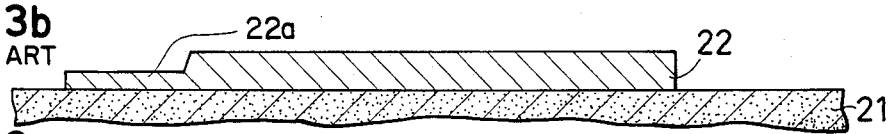
Figure 3C:
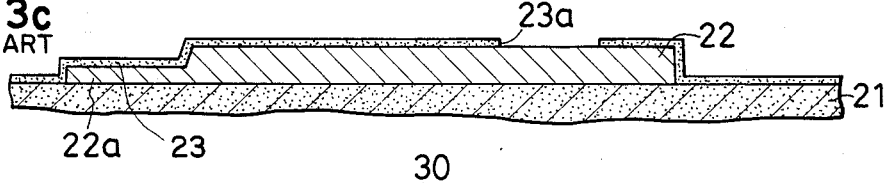
Figure 3D:
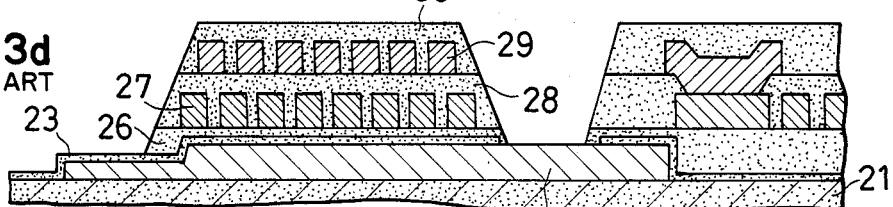
Figure 3E:
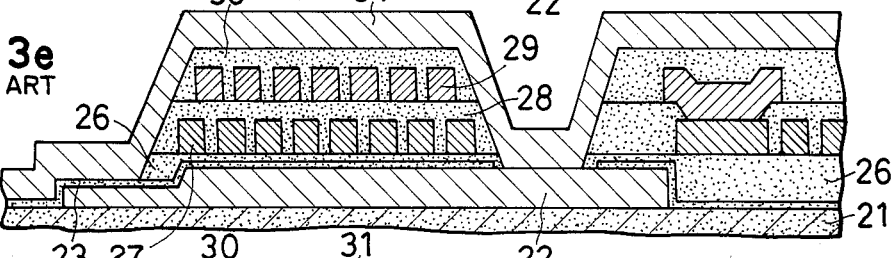
Figure 3F:
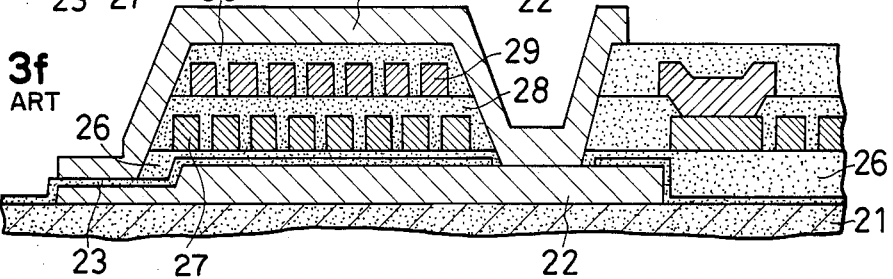

Then, as shown in FIG. 2(f), a magnetic material such as ferrite, sendust, amorphous metal is sputtered on the interlayer insulating layer 10 to couple the rear end 11 of the upper core layer with the front end 5a of the upper core layer and the second lower core layer 5b.

Thereafter, the protecting layer 12 is covered by coating or sputtering of synthetic resin or carbon on the rear end 11 of the upper core layer, and is then polished to complete the thin film magnetic material of this embodiment as shown in FIG. 1.

In the embodiment described above, the gap depth restricting portion 4a is formed to restrict the gap depth. However, this invention is not limited to the particular embodiment. For example, the gap depth restricting portion 4a may not always be provided.

In the embodiment described above, the lower core layer is divided into the first lower core layer 2 and the second lower core layer 5b, and the rear end 11 of the upper core layer and the lower core layer are connected at the high position by the connecting point lifting portion 4b. However, this invention is not limited to the particular embodiment. For example, this configuration may not always be formed.

According to the thin film magnetic head of this invention as described above, the upper core layer is separated into the front and rear ends of the upper core layer. Therefore, the front end of the upper core layer is formed in the early step after forming the magnetic gap layer to protect the magnetic gap layer, to eliminate the damage of the magnetic gap layer in the steps of forming the conductor coil layer and the interlayer insulating layer to obviate deterioration of the performance and the aggravation of the dimensional accuracy. Further, since the front end of the upper core layer is formed in the early step, the front end of the upper core layer can be formed in good flatness and high dimensional accuracy to obtain high dimensional accuracy for the track width.

Further, according to the thin film magnetic head of this invention, the gap depth restricting portion is formed to obtain the gap depth at the front end of the upper core layer in high dimensional accuracy.

Moreover, according to the thin film magnetic head of this invention, the lower core layer is separated into the first lower core layer and the second lower core layer, and the connecting point lifting portion is provided. Therefore, the connecting point of the second lower core layer to rear end of the upper core layer can be raised. Thus, the hole for coupling the second lower core layer with the rear end of the upper core layer becomes shallow so that the crystal growth of the upper core layer is less disordered on the oblique surface of the hole.

According to the method for manufacturing the thin film magnetic head of this invention, the magnetic gap layer is already formed on the lower layer of the front end of the upper core layer in the steps of forming the conductor coil layer, the inter layer insulating layer by the steps of forming the magnetic gap layer and the front end of the upper core layer. Therefore, the magnetic gap layer is not damaged in the steps of forming the conductor coil layer, the interlayer insulating layer to eliminate the deterioration of the performance and the aggravation of the dimensional accuracy in the thin film magnetic head, and it is formed in high dimensional accuracy in good flatness by forming front end of the upper core layer in the early step to obtain high dimensional accuracy in the track width in the thin film magnetic head.

According to the method for manufacturing the thin film magnetic head of this invention, the thin film magnetic head which has high dimensional accuracy of the gap depth is obtained by the steps of forming the gap depth restricting portion and the front end of the upper core layer.

According further to the method for manufacturing the thin film magnetic head of this invention, the connecting point of the second lower core layer and the rear end of the upper core layer is formed at the high position by the steps of forming the connecting point lifting portion and the second lower core layer. Therefore, the hole for coupling the second lower core layer with the rear end of the upper core layer becomes shallow, and thus can prevent a crystal growth of an upper core layer from being disordered on the oblique surface of the hole in the step of forming the rear end of the upper core layer in the thin film magnetic head.

What is claimed is:

1. A thin film magnetic head fabricated in accordance with a thin film manufacturing method comprising:
    a front end of an upper core layer formed on a magnetic gap layer, and
    a rear end of the upper core layer formed on an interlayer insulating layer for insulating a conductor coil layer to be coupled with the front end of the upper core layer.

2. A thin film magnetic head fabricated in accordance with a thin film manufacturing method comprising:
    a gap depth restricting portion formed on a magnetic gap layer,
    a front end of an upper core layer formed on the magnetic gap layer and the gap depth restricting portion, and
    a rear end of the upper core layer formed on an interlayer insulating layer for insulating a conductor coil layer to be coupled with the front end of the upper core layer.

3. A thin film magnetic head fabricated in accordance with a thin film manufacturing method comprising:
    a first lower core layer formed on a substrate made of a nonmagnetic material,
    a magnetic gap layer formed on the first lower core layer,
    a gap depth restricting portion and a connecting point lifting portion formed on the magnetic gap layer,
    a front end of an upper core layer and a second lower core layer formed on the magnetic gap layer, the gap depth restricting portion and the connecting point lifting portion, and
    a rear end of the upper core layer formed on an interlayer insulating layer for insulating a conductor coil layer to be coupled with the front end of the upper core layer and the second lower layer.

* * * * *